United States Patent
Rollick

(10) Patent No.: US 10,899,881 B1
(45) Date of Patent: Jan. 26, 2021

(54) POLYESTER MODIFICATION METHOD

(71) Applicant: Kevin L. Rollick, Munroe Falls, OH (US)

(72) Inventor: Kevin L. Rollick, Munroe Falls, OH (US)

( * ) Notice: Subject to any disclaimer, the term of this patent is extended or adjusted under 35 U.S.C. 154(b) by 0 days.

(21) Appl. No.: 16/277,550

(22) Filed: Feb. 15, 2019

Related U.S. Application Data

(60) Provisional application No. 62/702,118, filed on Jul. 23, 2018.

(51) Int. Cl.
| | |
|---|---|
| *C08G 63/91* | (2006.01) |
| *C08G 63/78* | (2006.01) |
| *C08K 5/42* | (2006.01) |
| *C08K 5/053* | (2006.01) |
| *C08K 5/09* | (2006.01) |

(52) U.S. Cl.
CPC ........... *C08G 63/916* (2013.01); *C08G 63/78* (2013.01); *C08K 5/053* (2013.01); *C08K 5/09* (2013.01); *C08K 5/42* (2013.01)

(58) Field of Classification Search
CPC ........ C08G 63/78; C08G 63/916; C08K 5/09; C08K 5/053; C08K 5/42
See application file for complete search history.

(56) References Cited

U.S. PATENT DOCUMENTS

| | | | |
|---|---|---|---|
| 4,238,593 A | 12/1980 | Duh | |
| 5,399,595 A | 3/1995 | Sublett et al. | |
| 5,472,831 A | 12/1995 | Nishiura et al. | |
| 6,042,773 A | 3/2000 | Teramoto et al. | |
| 6,430,348 B1 | 8/2002 | Asano et al. | |
| 6,479,619 B1 | 11/2002 | Duan | |
| 6,525,165 B1 | 2/2003 | Tsukamoto et al. | |
| 6,645,619 B2 | 11/2003 | Kato et al. | |
| 6,652,964 B1 | 11/2003 | Kato et al. | |
| 6,692,671 B2 | 2/2004 | Fujimoto et al. | |
| 7,919,105 B2 | 4/2011 | Blin et al. | |
| 7,928,150 B2 | 4/2011 | Kannan et al. | |
| 7,943,216 B2 | 5/2011 | Liu et al. | |
| 9,193,677 B2 | 11/2015 | Oster | |
| 2012/0207955 A1 | 8/2012 | Ogata et al. | |
| 2013/0289222 A1* | 10/2013 | Salsman | ............... C08G 63/916 525/444 |

OTHER PUBLICATIONS

Al-Sabagh, A.M., et al.; Egyptian Journal of Petroleum, 2016, vol. 25, p. 53-64.*

Fakirov, S.; Handbook of Thermoplastic Polyesters: Homopolymer, Copolymers, Blends, and Composites, 2002, Chapter 7, p. 317-361.*

* cited by examiner

*Primary Examiner* — Robert S Jones, Jr.
(74) *Attorney, Agent, or Firm* — Alvin T. Rockhill

(57) ABSTRACT

The subject invention provides a means for modifying existing polyester polymers to optimize characteristics for solid state polymerization and for utilization in a wide array of specific applications. For instance, the modification technique of this invention may be used to adjust the melting point, crystallization temperature (either from the solid or on cooling from the melt), glass transition temperature, natural stretch ratio, barrier properties, melt strength, and/or solid state polymerization characteristic of the polyester. Application of the instant invention could result in a polymer with substantially different physical properties, potentially allowing its use in heretofore high cost, specialty applications. A further advantage of the invention is that recycled polymer may be modified to broaden its potential uses into more demanding higher performance applications.

21 Claims, 1 Drawing Sheet

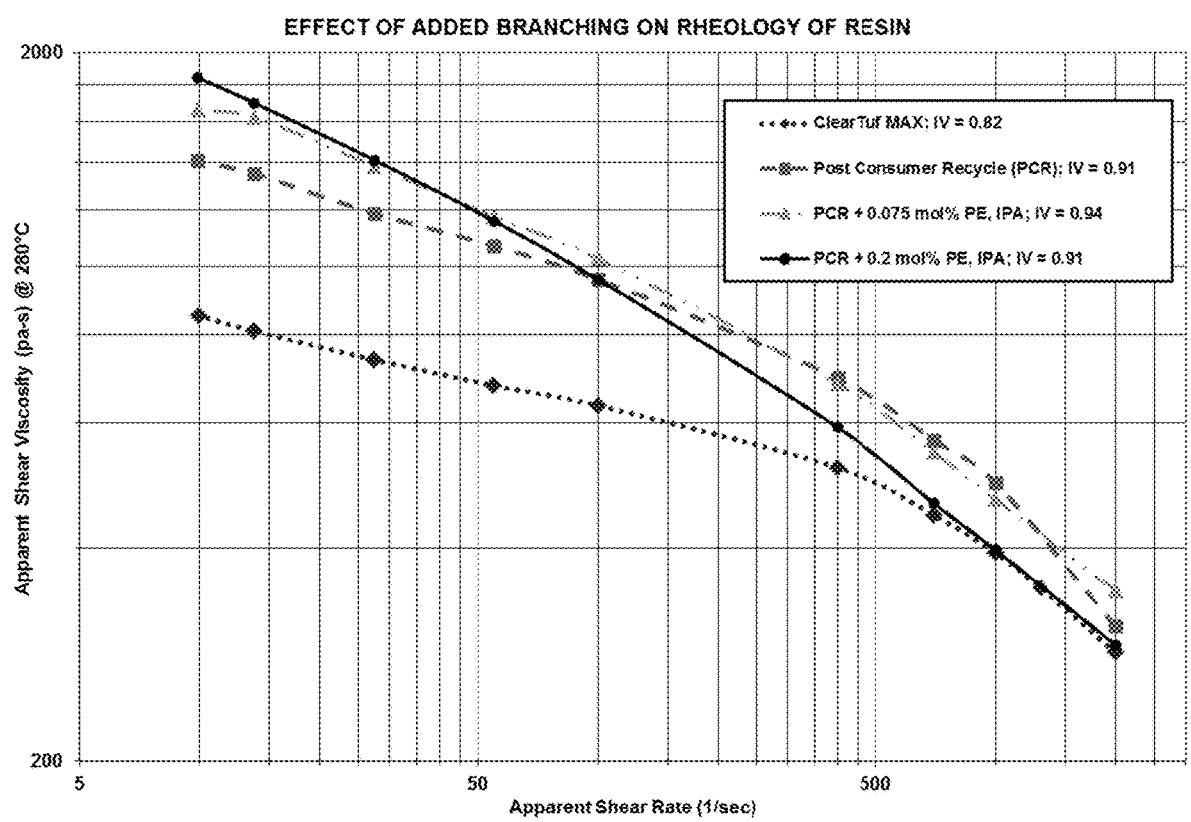

POLYESTER MODIFICATION METHOD

This application claims the benefit of U.S. Provisional Patent Application Ser. No. 62/702,118, filed on Jul. 23, 2018. The teachings of U.S. Provisional Patent Application Ser. No. 62/702,118 are incorporated herein by reference in their entirety.

FIELD OF THE INVENTION

This invention relates to the modification of a polyester polymer after the completion of melt polymerization. The polymers to be modified by this invention typically have an intrinsic viscosity (IV) of at least about 0.4 dL/g or a number average molecular weight ($M_n$) of at least about 10,000 daltons or a degree of polymerization (DP) of at least about 50. This modification may be undertaken to affect the physical properties of the final polymer including but not limited to the melting point, crystallization temperature either from the solid or on cooling from the melt, glass transition temperature, natural stretch ratio, barrier properties, and melt strength.

BACKGROUND OF THE INVENTION

Most commercial polyester resins are produced in large scale continuous polymerization reaction systems in which a diacid, usually either terephthalic acid (TPA) or naphthalene-2,6-dicarboxylic acid (NDA) or their dimethyl esters are reacted with ethylene glycol (EG), trimethylene glycol, 1,4-butane diol (BDO), 1,4-cyclohexanedimethanol (CHDM), or 2,2,4,4-tetramethyl-1,3-cyclobutanediol. Water (or methanol and excess glycol) are continuously removed to drive the polycondensation polymerization reaction. Small amounts of other co-monomers are often added to the polymerization recipe in order to modify the physical properties of the resulting resin. These co-monomers may include but are not limited to isophthalic acid (IPA), salts of sulfoisophthalic acid, phthalic acid, trimesic acid, trimellitic acid, pyromellitic acid, cyclohexane-1,4-dicarboxylic acid, cyclohexanediacetic acid, diphenyl-4,4'-dicarboxylic acid, naphthalene-2,6-dicarboxylic acid, diethylene glycol, triethylene glycol, tetraethylene glycol, polyethylene glycol, polyethylene glycol co-propylene glycol, 1,4-cyclohexanedimethanol, hydroquinone-bis-(2-hydroxyethyl) ether, neopentyl glycol, glycol esters of lithium or sodium sulfoisophthalic acid, trimethylolpropane, pentaerythritol, other modifying glycols having 5 to 16 carbons, or ethylene glycol, trimethylene glycol, 1,4-butane diol, and 2,2,4,4-tetramethyl-1,3-cyclobutanediol. In a few cases, relatively large quantities of co-monomers may be added, examples of which include some terephthalate/2,6-naphthalate co-polymers exemplified by the HiPerTuf™ polymers which had been marketed by Shell Chemical, high CHDM-containing TPA based polymers generically known as PETG co-polymers, and a series of TPA/bio-based diacids polymerized with BDO manufactured by Novamont under the Origo-Bi® tradename.

Polyester manufacture has moved toward larger and larger polymerization lines to increase efficiency and in turn to reduce cost. This has resulted in the manufacturing process becoming less flexible with it being increasingly more problematic and impractical to change the composition of the polyester to meet particular desired physical characteristics. In other words, current large scale manufacturing techniques are less suitable for making specialty polyesters having desired physical characteristics which are needed or desirable for use in various applications. For instance, specialty polymers which are modified with additional monomers to attain desired characteristics cannot be made efficiently in such large scale operations and are typically made in small scale operations at substantially higher cost.

It is possible to react glycols or polyol co-monomers with polyesters, such as those made in large scale facilities. However, in doing so the polymer chain of the polyester is cleaved and consequently the molecular weight of the polyester is reduced and its associated physical properties also changed (frequently in an undesirable manner). The insertion of a glycol or polyol into the polyester chain is analogous to the hydrolysis reaction, the reverse of the polymerization reaction, but with the difference being in that instead of regenerating an acid end group and an alcohol end group, two alcohol end groups are generated. This difference significantly affects the ability to rebuild molecular weight either through conventional solid state polymerization (SSP) or under vacuum in the melt.

The generation of two alcohol end groups on cleavage of a polyester chain by a glycol or polyol is deleterious to the ability to rebuild chain length or molecular weight for several reasons. Among the more important is the decrease of catalytic activity relative to the initial polymerization conditions. The chain building or polymerization reactions important in conventional polyester polymerization are catalyzed by acid. This may be either a proton as from the carboxylic acid end groups or by catalysts such as compounds of Sb, Ti, Fe, Zn, Ge and the like which are added or generated insitu from the metal. A second effect of polyester chain cleavage by a glycol or polyol on rebuilding molecular weight is that by-product removal becomes more difficult.

In the esterification polymerization reaction in which a carboxylic acid end group reacts with an alcohol end group, the by-product is water, a small, relatively volatile compound which can vaporize from the polymer and be removed. Alternatively, the reaction of two chain ends, both of which are alcohols, a transesterification reaction, produces as a by-product a glycol or polyol. These glycol or polyol molecules are much more difficult to remove from the reacting polymer and can cleave the growing polyester chain again resulting in no net change in polymer molecular weight.

To attain fast polymerization rates and to reach high molecular weights in solid state polymerizations to it important for the ratio of carboxyl end groups to hydroxyl end groups in the polyester being polymerized to be in an optimal range. This optimum will vary with the type of solid state polymerization reactor being utilized. The importance of this ratio in solid state polymerizations which are conducted in static bed reactors is described by Duh in U.S. Pat. No. 4,238,593. More specifically, Duh describes a method for the production of a high molecular weight, high purity polyester comprising the steps of (a) reacting a glycol and a dicarboxylic compound selected from the group consisting of dicarboxylic acids and dicarboxylic esters to form a polyester prepolymer having an intrinsic viscosity from about 0.40 dl/g to about 0.62 dl/g and having a carboxyl end group content from about 18% to about 40% of total end groups, said dicarboxylic acids selected from the group consisting of alkyl dicarboxylic acids having a total of from 2 to 16 carbon atoms, and aryl dicarboxylic acids containing a total of from 8 to 16 carbon atoms, said dicarboxylic esters selected from the group consisting of alkyl esters having from 4 to 20 carbon atoms and an alkyl substituted aryl ester having from 10 to 20 carbon atoms, said glycol selected from the group consisting of glycols having 2 to 10 carbon atoms, and (b) polymerizing in a solid state in a static bed, said polyester prepolymer so that a high molecular weight, high purity polycondensed polyester is formed, said polycondensed polyester having an intrinsic viscosity of at least 0.70 dl/g and having an acetaldehyde impurity concentration less than about 3.0 parts per million.

In many cases there is a need to modify polyesters made by melt polymerization to optimize solid state polymerization characteristics for a particular type of solid state polymerization reactor. There is also a need to modify preexisting polyesters from various sources to adjust their physical properties to attain specific requirements. This is particularly true in cases where the polyester having the needed characteristics is simply not available or is too costly. There is also a long felt need for a technique to modify recycled polyester, such a polyethylene terephthalate (PET) from recycled beverage bottles, to make it suitable for higher performance application than those in which it is currently used, such as in strapping or fiberfill.

SUMMARY OF THE INVENTION

The subject invention provides a means for modifying existing polyester polymers to optimize characteristics for solid state polymerization and for utilization in a wide array of specific applications. For instance, the modification technique of this invention may be used to adjust the melting point, crystallization temperature (either from the solid or on cooling from the melt), glass transition temperature, natural stretch ratio, barrier properties, melt strength, and/or solid state polymerization characteristic of the polyester. Application of the instant invention could result in a polymer with substantially different physical properties, potentially allowing its use in heretofore high cost, specialty applications. A further advantage of the invention is that recycled polymer may be modified to broaden its potential uses into more demanding higher performance applications.

The present invention more specifically discloses a method for modifying a polyester polymer, comprising reacting (a) the polyester polymer (b) a first compound which has at least two reactive groups which are selected from the group consisting of hydroxyl groups, primary amine groups, or secondary amine groups and (c) a second compound which has at least two reactive groups capable of reacting with the reactive groups of the first compound to produce a modified polyester polymer, wherein said method is conducted in the melt phase, and wherein the polyester polymer has an intrinsic viscosity of at least about 0.40 dL/g as measured at 25° C. in a solvent consisting of 60 weight percent phenol and 40 weight percent tetrachloroethane.

The subject invention further reveals a method for modifying a polyester polymer comprising reacting the polyester polymer with a hydroxy substituted carboxylic acid to produce a modified polyester polymer, wherein said method is conducted in the melt phase, and wherein the polyester polymer has an intrinsic viscosity of at least about 0.40 dL/g as measured at 25° C. in a solvent consisting of 60 weight percent phenol and 40 weight percent tetrachloroethane.

BRIEF DESCRIPTION OF THE DRAWINGS

FIG. 1 is a graph showing the effect of added branching on the melt rheology of the resins in accordance with this invention as described in Example 1.

DETAILED DESCRIPTION OF THE INVENTION

Virtually any type of polyester can be modified in accordance with the method of this invention. The polyester can be made by conventional melt polymerization or it can be made by a combination of melt polymerization followed by solid state polymerization. The production of polyester by conventional melt polymerization is described in U.S. Pat. No. 3,551,386. The teachings of U.S. Pat. No. 3,551,386 are incorporated herein by reference for the purpose of teaching such a conventional melt polymerization technique.

The polyesters modified in accordance with this invention are typically synthesized by the condensation polymerization of a dicarboxylic acid or a dicarboxylic ester with a glycol. The dicarboxylic acids may be an alkyl and contain a total of from 2 to 15 carbon atoms. Preferably, the acids are aryl or an alkyl substituted aryl containing from about 8 to about 16 carbon atoms. Specific examples of alkyl dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic (terephthalic) acid and isophthalic acid, and naphthalene dicarboxylic acid. Lithium sulfoisophthalic acid, sodium sulfoisophthalic acid, glycol esters of lithium sulfoisphthalic acid, and glycol esters of sodium sulfoisphthalic acid are often preferred. Specific examples of alkyl substituted aryl acids include the various isomers of dimethylphthalic acid, such as dimethylisophthalic acid, dimethylorothophthalic acid and dimethylterephthalic acid; the various isomers of diethylphthalic acid, such as diethylisophthalic acid, diethylorthophthalic acid and diethylterephthalic acid; the various isomers of dimethylnaphthalene dicarboxylic acid, such as 2,6-dimethylnaphthalene dicarboxylic acid and 2,5-dimethylnaphthalene dicarboxylic acid; and the various isomers of diethylnaphthalene dicarboxylic acid. Generally, dimethylterephthalic acid is preferred with terephthalic acid being highly preferred.

In lieu of the various dicarboxylic acids, the various esters thereof may be utilized. Thus, the dicarboxylic compound may be an alkyl ester containing a total of from about 4 to 20 carbon atoms, as well as alkyl substituted aryl esters containing from about 10 to about 20 carbon atoms may be utilized. Examples of specific alkyl diesters include dimethyladipate, diethyladipate, and the like. Specific examples of various alkyl substituted aryl diesters include the various isomers of dimethylphthalate, the various isomers of diethylphthalate, the various isomers of dimethylnaphthalate, and the various isomers of diethylnapthalate. Preferably, the various isomers of dimethylphthalate (dimethylterephthalate) are used.

These carboxylic acids or the esters thereof react in the esterification process with a glycol containing from about 2 to 10 carbon atoms. The glycols may be straight-chained or branched. Specific examples include ethylene glycol, propylene glycol, trimethylene glycol, 1,2-butane diol, 1,3-butane diol, 1,4-butane diol, 2,3-butane diol, neopentyl glycol, 1,4-cyclohexanedimethanol and the like. Of the various glycols, those having from 2 to 8 carbon atoms are preferred, with ethylene glycol and 1,4-butane diol being highly preferred.

A variety of modifications to the melt polymerization process, used either alone or in combination, can be utilized to achieve a melt polymer with the optimal carboxyl content. When dicarboxylic acids and glycol are used as the precursors, the polyester prepolymer can be prepared with or without the use of a heel to speed up the esterification of the acid. The heel is an esterification product recycled to be used to increase the solubility of the dicarboxylic acid and thereby increase the reaction rate of the dicarboxylic acid in the glycol. The use of a heel is explained in U.S. Pat. No. 4,020,049 and in U.S. Pat. No. 3,427,287. The teachings of U.S. Pat. No. 4,020,049 and in U.S. Pat. No. 3,427,287 are both incorporated herein by reference for the purpose of teaching melt polymerization techniques that are suitable for use in synthesizing polyesters by melt polymerization.

When a heel is not used, the glycol/dicarboxylic acid molar charge ratio is usually about 1.2:1.0 or greater because a lower charge ratio will cause agitation and mixture difficulties. With this ratio, the polyester prepolymer produced will have a carboxyl content far lower than the optimal value and the prepolymer will have a lower reaction rate in the subsequent solid state polymerization. To optimize the carboxyl content of the polyester prepolymer, make-up dicarboxylic acid can be added after partial completion of the esterification of the acid. While it is possible to add the make-up dicarboxylic acid at any time during the later stages of the esterification of the acid, it is desirable to add the make-up acid after approximately 90%-95% of the acid has been esterified. The amount of make-up dicarboxylic acid to be added is such that the overall glycol to acid molar charge ratio is from about 1.02:1.0 to about 1.15:1.0, and preferably within 1.03:1.0 to about 1.10:1.0. In cases where terephthalic acid is used as the dicarboxylic acid, the charge ratio is preferably within the range of about 1.03:1.0 to 1.10:1.0.

When a heel is used, the heel is first produced by reacting approximately 1.20 moles of glycol with 1.0 moles of dicarboxylic acid. After the esterification of the acid is approximately 95% complete, make-up dicarboxylic acid is added to the heel to adjust the overall glycol/acid molar ratio in the heel to be from about 1.02:1.0 to about 1.15:1.0, the desired molar ratio. After the new heel with the desired molar ratio is esterified within approximately 90%-95% of completion, a batch having from about 1.02:1.0 to about 1.15:1.0 glycol/acid ratio can be charged into the vessel containing the heel. Because of the presence of the heel having the desired molar ratio, there will be no agitation problem with the low glycol/acid charge ratio.

The partial melt process utilizing the dicarboxylic acid, as modified to achieve the low glycol/acid molar ratio, may be carried out under atmospheric or super atmospheric pressures at temperatures between about 240° C. to about 290° C. If a dicarboxylic ester is used in place of the dicarboxylic acid, no heel is needed for the reaction between the glycol and the dicarboxylic ester, denominated the ester exchange reaction. An ester exchange catalyst such as Mn, Zn, and/or Ti is needed. The polyester prepolymer produced from the dicarboxylic ester invariably has a very low carboxyl number which has been found to polymerize very slowly in the subsequent solid state polymerization. Again, the carboxyl content of the prepolymer may be optimized by the addition of dicarboxylic acid, in this case for the first time. Because a higher glycol/dicarboxylic ester charge ratio, (e.g. 1.80:1.0-2.20:1.0) ratio is usually used, the dicarboxylic acid can be charged initially with the dicarboxylic ester and the glycol or added after a partial completion of the ester exchange reaction. It has been found that, when using terephthalic acid, dimethylterephthalate, and ethylene glycol, that it is preferred to add the terephthalic acid after the completion (from about 95% to about 100%) of the ester exchange reaction. The molar ratio of dicarboxylic acid to dicarboxylic ester is from about 0.05:1.0 to about 0.50:1.0, and preferably from about 0.10:1.0 to about 0.30:1.0. Whenever terephthalic acid and dimethylterephthalate are used in the preferred embodiment, the molar ratio is preferred to be from about 0.10:1.0 to about 0.30:1.0.

The ester exchange reaction is conducted at atmospheric pressures and at temperatures from about 180° C. to about 250° C. After completion of the ester exchange reaction and the addition of the dicarboxylic acid according to the preferred method, a polycondensation catalyst such as Sb or Ti is added, and the mixture is permitted to react for approximately 10 to 30 minutes.

Whether prepared using the dicarboxylic acid or the dicarboxylic ester, the melt process then enters the partial vacuum stage wherein the atmospheric or super atmospheric pressures of the esterification stage is reduced to sub-atmospheric pressures. A condensation reaction catalyst is added to the polymer made from the dicarboxylic acid to begin the partial polycondensation. The addition of the polycondensation catalyst, whether it be Sb, Ti, Fe, Zn, Co, Pb, Mn, Nb, or Ge, is preferably added to the partial melt process prior to the reduction of the atmospheric pressure to sub-atmospheric pressure. The polycondensation reaction continues after pressure has reached a full vacuum of approximately less than 5.0 and preferably less than 1.0 millimeters of mercury, until the desired intrinsic viscosity of between 0.35 and 0.62 dl/g is reached. The desired polycondensation reaction temperature during the imposition of a partial, and later, a full vacuum is between about 260° C. and 290° C. and preferably between 270° C. and 285° C.

The polyester is then typically solidified, pelletized or diced for utilization in manufacturing product or for further processing, such as by solid state polymerization or for modification in accordance with this invention. In cases where higher molecular weight than can effectively be produced (or can be made) by melt polymerization is desired the polyester (sometimes referred to as the prepolymer) is subsequently solid state polymerized to the higher molecular weight. According to the requirements for the size of the prepolymer particles, the pelletizing or dicing processes may produce a usable particle size between about a cube having ⅛ inch sides and a particle to be retained by 20 mesh. Desirably, the particles may pass through 6 mesh and be retained by 12 mesh. Preferably, the particles may pass through 8 mesh and be retained by 10 mesh. The mesh values are determined according to the Tyler Mesh Classification System.

In cases where solid state polymerization is utilized the polyester is transferred to a solid state polymerization reactor for solid state polymerization in a fluidized bed, static bed, a modified static bed, an inclined cylindrical rotating reactor or under conditions of forced motion (such as in a blender dryer). The static bed solid state polymerization is preferred because of its lower energy requirements. Typically, catalysts such as antimony, titanium, iron, zinc, cobalt, lead, manganese, niobium, and germanium are utilized increase polymerization rates. It is typically preferred to utilize an antimony or a titanium catalyst with titanium generally being most preferred. U.S. Pat. No. 4,238,593 reveals a solid state polymerization which is carried out in a static bed reactor. The teachings of U.S. Pat. No. 4,238,593 are incorporated herein by reference for the purpose of disclosing a solid state polymerization technique which is suitable for making polyester which can be modified in accordance with this invention.

U.S. Pat. No. 8,790,580 described the use of an inclined cylindrical rotating reactor in the solid state polymerization of polyester. In the process disclosed by this patent the inclined cylindrical rotating reactor comprising an axis of rotation, granules of polyester treated within the reactor, a granules of polyester flow regime, at least two mixing devices and an inert purge gas, for the solid state polymerization of the granules of polyester, wherein the granules of material treated within the reactor comprise a polyester and the reactor has a temperature in the range of about 140° C. to about 235° C., the axis of rotation is central and not parallel to the horizontal line perpendicular to the force of gravity, the granules of polyester flow regime is characterized by a Froude Number $Fr=(\omega^2 \times R/g)$ comprised in the range of $1 \times 10^{-4}$ to 0.5; where $\omega$ is the angular velocity of the reactor; R is the internal radius of the reactor and g is the gravity of acceleration=9.806 m/s; and each of the at least two mixing devices has a height, width, and an equivalent length defined as the distance between the plane perpendicular to the axis of rotation that contains the point where the mixing device first protrudes from the reactor wall and the plane perpendicular to the axis of rotation that contains the point where the mixing device stops protruding from the wall and the equivalent length of the mixing device is selected from the group consisting of equivalent lengths less than $\frac{1}{10}^{th}$ the length of the reactor, so as the granules of the polyester treated within the reactor pass through the reactor due to the force of gravity as well as the reactor rotation with a plug flow like behavior; and the at least two mixing devices are connected in a manner so that the inert purge gas can pass from the first mixing device to the second mixing device through a connector; said use comprising the steps of: introducing the granules into the top of the reactor passing the granules through the reactor while subjecting the granules to a stream of inert purge gas below the turbulent rate.

The modification technique of this invention can be employed to modify virgin polyester or polyester from recycle streams. This modification is carried out by melting the polyester and mixing a first compound which has at least two reactive groups which are selected from the group consisting of hydroxyl groups, primary amine groups, or secondary amine groups and a second compound which has at least two reactive groups capable of reacting with the reactive groups of the first compound therein. The first compound is typically added to the molten polyester prior to adding the second compound. However, the two compounds can be added in either order or added to the molten polyester simultaneously. This modification procedure can be carried out in any vessel which is capable of maintaining the polyester above its melting point and which is equipped to provide adequate mixing of the first compound and the second compound throughout the polyester being modified. For instance, the reaction can be conducted in an extruder, such as an extruder having multiple mixing and heating zones.

Various salts of phosphonated dicarboxylic acids and polycarboxylic acids as well as sulfonated dicarboxylic acids and polycarboxylic acids are useful for modifying polyesters to achieve the purpose of creating a compatibilizing polymer, improving the dyability of a polymer, increasing its hydrophilicity, incorporation of a bactericide and the like. Examples of such polymer modifying agents may be found in numerous United States patents and United States Patent Applications Publications, including U.S. Pat. Nos. 9,193,677, 7,943,216, 7,928,150, 6,692,671, 6,525,165, 6,479,619, 5,472,831, and United States Patent Application Publication No. 2012/0207955. The teachings of U.S. Pat. Nos. 9,193,677, 7,943,216, 7,928,150, 6,692,671, 6,525,165, 6,479,619, 5,472,831, and United States Patent Application Publication No. 2012/0207955 are incorporated herein by reference for the purpose of describing such salts and the benefits of modifying polyesters therewith. Particularly useful are salts of the various sulfobenzenedicarboxylic acids including 4-sulfophthalic acid, sulfoterephthalic acid, 5-sulfoisophthalic acid, 4-sulfonaphthalene-2,7-dicarboxylic acid, and 4-sulfonaphthalene-2,6-dicarboxylic acid and 2-sulfosuccinic acid.

Depending upon the intended application, a variety of cations are useful counter ions. Particularly useful in many applications are the lithium, sodium, potassium, zinc, magnesium, calcium, cobalt, and silver salts as well as quaternary phosponium salts such as tetrabutylphosphonium, benzyltributylphosphonium, tetraphenylphosphonium and the like. Any of these sulfocarboxylic acids may be incorporated as polymer modifying agents as the free carboxylic acid, or as bis- or mono-ester wherein the alcohol used to create the ester function still has a free hydroxyl group available for further esterification reaction.

Lithium bis-2-hydroxyethyl-5-sulfoisophthalate may be prepared as an ethylene glycol solution as described in U.S. Pat. Nos. 9,193,677 and 6,479,619 or simply by heating lithium sulfoisophthalate, with sufficient ethylene glycol to yield a final concentration of 40% bis-ester, at a temperature within the range of 170° C. to 185° C. with removal of water as a by-product. After completion of esterification, the resulting solution can be filtered and cooled. Dry lithium bis-2-hydroxyethyl-5-sulfoisophthalate may be obtained by pouring 100 g of the cooled solution into 1.5 L acetone with stirring. The acetone/EG solution can be decanted off the resulting oil and the oil treated 2 times with an additional 0.5 L of acetone with them being stirred together for 1 hour each. After decanting off the acetone wash, the oil can be dried in a vacuum oven at a temperature of 50° C. for 20 hours and then broken up and powdered. Other $\Omega$-hydroxyalkyl sulfocarboxylates may be similarly prepared for instance by use of 1,3-propane diol or 1,4-butane diol in place of ethylene glycol.

Test Methods

Intrinsic Viscosity

The intrinsic viscosity (IV) of the polymer samples was measured as 0.5% solutions in 60/40 w/w phenol/tetrachloroethane in accordance with ASTM Method D 4603 using a Rheotek RPV-1 automatic viscometer fitted with an Ubbelohde 1B viscometer. Solution flow time relative to that of the pure solvent was measured, relative viscosity determined and intrinsic viscosity calculated using the Billmeyer equation with intrinsic viscosity values being reported in units of dL/g.

Carboxyl Number (Milliequivalents COOH End Groups/$10^6$ g Polymer)

In determining the carboxyl number of polyester samples approximately 0.1 g of polymer was dissolved in 5 mL of dry nitrobenzene at 200° C. Then, 5 mL of benzyl alcohol and 2 drops phenol red indicator were added. The solution was then subsequently titrated to a blue endpoint using a standard sodium hydroxide/benzyl alcohol solution.

Thermal Properties

The melting points (Tm) and glass transition temperatures (Tg) of the polymer samples were determined using a TA Instruments Model Q2000 DSC. Heating and cooling rates for measurements were set at 10° C./minute.

Melt Rheology

The melt rheology of polymers was determined using a Dynisco Model 7000 polymer test system. Polymer samples were dried overnight in a vacuum oven at 120° C. and were then loaded into the rheometer at 280° C. under a nitrogen blanket. After preheating at the test temperature for 5 minutes, samples were extruded through a stainless steel capillary die which was 25.4 mm long, 0.762 mm in diameter and which had a 120° conical entrance angle. Shear rates were varied from 10 to 2000 sec$^{-1}$ by varying the crosshead speed. For comparative purposes, CLEARTUF® MAX™ polyester resin was also included in this study.

Example 1

Addition of Pentaerythritol (and Isophthalic Acid) to Post Consumer Recycle

Mixed post-consumer recycle PET (PCR) flake from various sources was ground to pass through a 5 mm screen. This material (~30 lbs.) was mixed to produce a uniform blend. A solution of 1.2 g pentaerythritol (PE) (0.075 mol % ethylene glycol (EG) equivalents) in 300 mL methanol was added to 4500 g of the blended PCR flake in a 5 gallon bucket. The bucket was sealed and placed on a roller for 2 hours to uniformly coat the PCR flake with PE. The bucket was then removed from the roller, unsealed and dried in a vacuum oven overnight applying full vacuum at a temperature of 160° C. After drying, 1500 g of PE treated flake was removed and blended in a sealed can on a roller with 1.8 g of powdered isophthalic acid (IPA). The PCR samples were extruded through a 27 mm Leistritz twin screw extruder (L/D=40) and pelletized to generate samples 1 through 3 as described in Table I. Likewise, samples 5 and 6 were prepared by increasing the PE to 3.4 g (0.2 mol % ethylene glycol (EG) equivalents) and the IPA to 5.2 g.

It was noted that the molecular weight as reflected in the IV measurement was relatively unaffected by the combination of the low level of alkanolosis by the PE and its tetrafunctionality. This is shown by the generic equation below wherein R represents the continuation of the polymer chain or in the case of a polymer chain end a hydrogen atom, alkyl group, or substituted alkyl group, such as a hydroxy alkyl group.

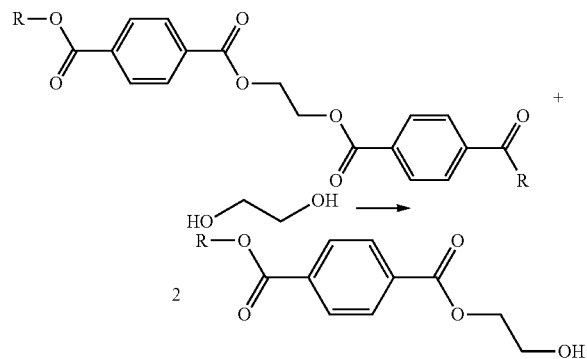

However, water generated by esterification on the addition of IPA did result in hydrolysis as illustrated below:

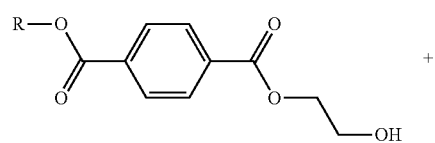

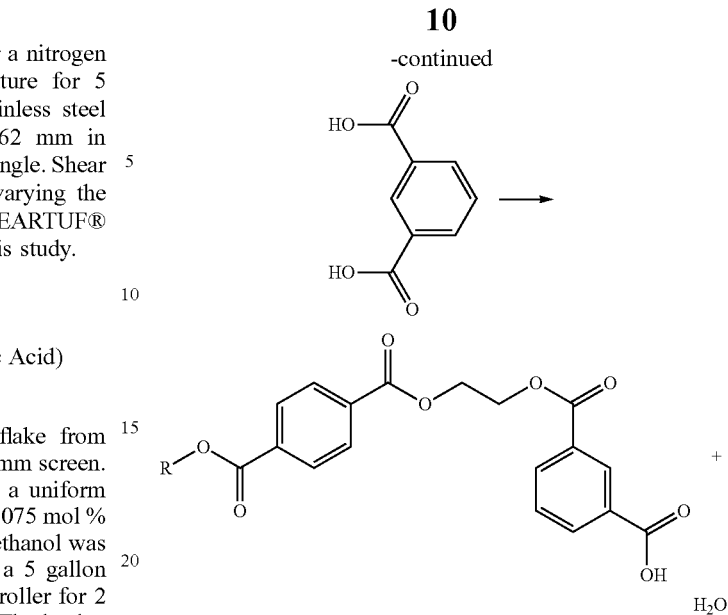

The polymer of the extruded samples had a resulting decreased molecular weight caused by the chain breaking reaction illustrated below:

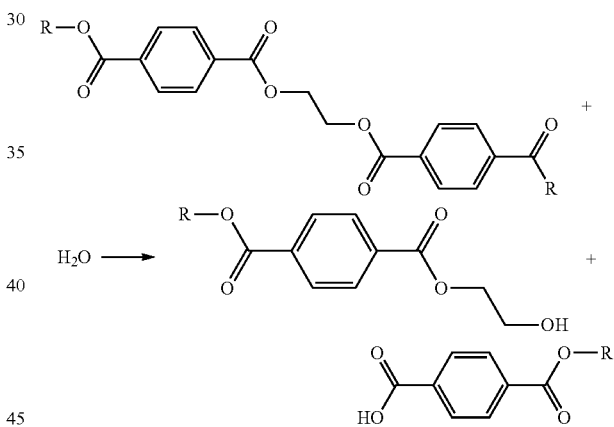

After crystallizing in a hot air oven at 160° C., samples were solid state polymerized in laboratory bench scale glass reactors. Samples were dried overnight under nitrogen flow at a temperature of 120° C. After 15 hours the temperature was increased to 215° C. and maintained at that temperature for an additional 5.5 hours after which the temperature was again increased to 225° C. for an additional 3.5 hours. Samples were withdrawn periodically for measurement of intrinsic viscosity. Rates of solid state polymerization were significantly increased by the addition of IPA in an equimolar amount to the level of PE utilized.

Incorporation of the branched PE is further demonstrated by the melt viscosity of the polymers (FIG. 1). The PE containing, branched polymers show the expected increased low shear viscosity and low high shear viscosity, that containing 0.2 mol % PE having nearly the same melt viscosity at an apparent shear rate of 2000/sec as Cleartuf® Max™ polyester despite its 0.1 dL/g higher IV.

TABLE I

Addition of Pentaerythritol and Isophthalic Acid to
Post-Consumer Recycle in a Twin Screw Extruder

| Run | mol % PE | mol % IPA | IV | COOH (meq/$10^6$ g) |
|---|---|---|---|---|
| 1 | | | 0.625 | 50.9 |
| 2 | 0.075 | | 0.637 | 46.3 |
| 3 | 0.075 | 0.075 | 0.597 | 51.3 |
| 5 | 0.2 | | 0.637 | 46.8 |
| 6 | 0.2 | 0.2 | 0.538 | 65.5 |

TABLE II

Results of Solid State Polymerization of
Pentaerythritol Modified Post-Consumer Recycle

| sample | IV at hrs | | | | | | Rate of IV increase | |
|---|---|---|---|---|---|---|---|---|
| | 0 | 2 | 4 | 6 | 8 | 9 | 0-4 hrs | 6-9 hrs |
| 1 | 0.631 | 0.676 | 0.727 | 0.779 | 0.864 | 0.910 | 0.024 | 0.044 |
| 2 | 0.646 | 0.706 | 0.754 | 0.819 | 0.896 | 0.964 | 0.027 | 0.047 |
| 3 | 0.606 | 0.643 | 0.667 | 0.749 | 0.853 | 0.936 | 0.015 | 0.061 |
| 5 | 0.641 | 0.705 | 0.777 | 0.840 | 0.907 | 1.004 | 0.034 | 0.052 |
| 6 | 0.550 | 0.575 | 0.620 | 0.703 | 0.796 | 0.909 | 0.018 | 0.066 |

Note:
Samples were dried overnight under nitrogen flow at 120° C. After 15 hours, the temperature was increased to 215° C. and maintained for 5.5 hours after which it was increased to 225° C.

FIG. 1 shows the effect of added branching on the melt rheology of the resins.

Example 2

Modification of Virgin Bottle Grade Polyester Resin

Cleartuf® 8006C polyester resin was dried in a vacuum oven overnight at full vacuum at a temperature of 160° C. A molten, commercial grade of 1,4-cyclohexanedimethanol (30/70% cis/trans) 116 g was added to 7718 g hot, dry polymer in a 5 gallon can, sealed and placed on a roller for 1 hour to uniformly coat the pellets. This was used to generate samples 9, 10 and 12 by extrusion through the Leistritz extruder as in Ex. 1. Samples 10 and 12 additionally had solid glutaric acid and isophthalic acid respectively, added to the polymer melt through the use of an additional feeder at a port about 12 diameters downstream of the feed throat. Sample 8 is a control sample of Cleartuf® 8006C polyester resin extruded under the same conditions used for the rest of the experiment.

After extrusion, samples were crystallized in a hot air oven at 160° C. and solid state polymerized in lab bench glass reactors. Samples were dried for 2 hours under a nitrogen flow at a temperature of 180° C. The temperature was increased to 215° C. and maintained at that temperature for an additional 24 hours. Samples were withdrawn periodically for IV measurement. As can be seen in Table IV, rates of solid state polymerization and final IV were significantly increased on addition of either acid in equimolar amounts to the CHDM.

TABLE III

Modification of Virgin
Cleartuf® 8006C in a Twin Screw Extruder

| Run | mol % CHDM | acid added | mol % Acid | IV | COOH |
|---|---|---|---|---|---|
| 8 | | | | 0.709 | 41.2 |
| 9 | 2.0 | | | 0.295 | 42.5 |
| 10 | 2.0 | glutaric | 2.0 | 0.291 | 200.9 |
| 12 | 2.0 | IPA | 2.0 | 0.293 | 77.0 |

TABLE IV

Results of Solid State Polymerization of CHDM Modified Cleartuf® 8006C

| Run | init IV | init COOH (meq/$10^6$ g) | SSP time (hrs) | IV final | COOH (meq/$10^6$ g) | rate of IV inc | Tg (° C.) | mp2 (° C.) |
|---|---|---|---|---|---|---|---|---|
| 8 | 0.709 | 41.2 | 5.5 | 0.949 | 26.6 | 0.044 | 80.6 | 242 |
| 9 | 0.295 | 42.5 | 24 | 0.617 | 8.4 | 0.011 | | |
| 10 | 0.291 | 200.9 | 24 | 0.899 | 32.7 | 0.022 | 77.5 | 235 |
| 12 | 0.293 | 77.0 | 24 | 0.772 | 22.9 | 0.017 | 79.1 | 238 |

While the polymer produced in run 8 readily repolymerized to and beyond its starting IV, with a concomitant reduction in COOH end groups, the addition of 2 mol % glycol in the form of CHDM substantially reduced the molecular weight but had no effect on the number of COOH end groups. As a result, repolymerization was substantially retarded and even after 24 hrs, only achieved an IV of 0.62 with the COOH end groups being reduced to just 8. In contrast, the melt addition of either glutaric acid or isophthalic acid, equimolar to the glycol added reduced the IV of the extrudate even further but with the desired increase of COOH end groups and the ability to increase the molecular weight or IV of the resulting polymers substantially above that achieved in their absence. Further, the rate of IV increase was about double that of the CHDM only sample.

Additional evidence of the incorporation of the CHDM and added diacids in the polymer chain is seen in the reductions observed in both the Tg and the melting point of the repolymerized extrudates.

Example 3

Modification of Low IV Homopolymer

A low IV melt, homopolymer prepared from dimethyl terephthalate (DMT) and EG was dried overnight in a vacuum oven at a temperature of 160° C. After drying, 18.8 g (0.75 mol %) diethylene glycol (DEG) was added to 4540 g of the dried polymer in a 5 gallon can, sealed and placed on a roller for 1 hour to uniformly coat the pellets. This was used to generate samples 15 and 16 by extrusion through the Leistritz extruder as in Example 1. Sample 16 additionally had finely powdered isophthalic acid added to the polymer melt through the use of an additional feeder at a port about 12 diameters downstream of the feed throat. Sample 14 is a control sample of the melt resin dried and extruded under the same conditions used for the rest of the experiment.

After extrusion, samples were crystallized in a hot air oven at a temperature of 160° C. and then solid state polymerized in laboratory scale bench glass reactors. Samples were dried for 2 hours under a nitrogen flow at a temperature of 180° C. The temperature was subsequently increased to 215° C. and maintained at that temperature for 24 hours. Samples were withdrawn periodically for IV measurement. As can be seen in Table VI, the solid state polymerization rate and final IV were significantly increased on addition of IPA to the resin during extrusion. As in Example 2, Tg and especially Tm were reduced by incorporation of the comonomers in the polymer chain.

TABLE V

Modification of Low IV Homopolymer by DEG/IPA in a Twin Screw Extruder

| Run | mol % DEG | mol % IPA | IV | COOH |
|---|---|---|---|---|
| 14 | | | 0.438 | 25.0 |
| 15 | 0.75 | | 0.352 | 24.1 |
| 16 | 0.75 | 0.75 | 0.326 | 75.1 |

TABLE VI

Results of Solid State Polymerization of DEG/IPA Modified Homopolymer

| Run | init IV | init COOH (meq/$10^6$ g) | SSP time (hrs) | IV final | COOH (meq/$10^6$ g) | rate of IV inc | Tg (° C.) | mp2 (° C.) |
|---|---|---|---|---|---|---|---|---|
| 14 | 0.438 | 25.0 | 24 | 0.769 | 11.0 | 0.0109 | 80.5 | 252 |
| 15 | 0.352 | 24.1 | 24 | 0.637 | 8.9 | 0.0086 | 80.5 | |
| 16 | 0.326 | 75.1 | 24 | 0.724 | 17.3 | 0.0146 | 80.3 | 249 |

While certain representative embodiments and details have been shown for the purpose of illustrating the subject invention, it will be apparent to those skilled in this art that various changes and modifications can be made therein without departing from the scope of the subject invention.

What is claimed is:

1. A method for modifying a polyester polymer, which includes a reaction which is conducted in the melt phase, said melt phase reaction consisting essentially of mixing (b) a first compound which has at least two reactive groups which are selected from the group consisting of hydroxyl groups, primary amine groups, or secondary amine groups and (c) a second compound which has at least two reactive groups capable of reacting with the reactive groups of the first compound into (a) the polyester polymer which is in the molten state to produce a modified polyester polymer, wherein the polyester polymer has an intrinsic viscosity of at least about 0.40 dL/g as measured at 25° C. in a solvent consisting of 60 weight percent phenol and 40 weight percent tetrachloroethane.

2. The method for modifying a polyester polymer as specified in claim 1 wherein the first compound is added to the polyester polymer with the second compound being subsequently added to the polyester polymer.

3. The method for modifying a polyester polymer as specified in claim 1 wherein the first compound and the second compound are simultaneously added to the polyester polymer.

4. The method for modifying a polyester polymer as specified in claim 1 wherein the polyester polymer is comprised of a hydroxyl component and wherein the hydroxyl component includes at least 80 mole percent of one or more members selected from the group consisting of ethylene glycol, trimethylene glycol, 1,4-butane diol and 2,2,4,4-tetramethyl-1,3-cyclobutanediol, based on 100 mole percent of hydroxyl component.

5. The method for modifying a polyester polymer as specified in claim 4 wherein the polyester polymer is comprised of a carboxylic acid component and wherein the carboxylic acid component includes at least 80 mole percent of one or more members selected from the group consisting of terephthalic acid and naphthalene-2,6-dicarboxylic acid, based on 100 mole percent of carboxylic acid component.

6. The method for modifying a polyester polymer as specified in claim 1 wherein the first compound is a glycol or polyol.

7. The method for modifying a polyester polymer as specified in claim 6 wherein the first compound is a glycol or polyol which is selected from the group consisting of diethylene glycol, triethylene glycol, tetraethylene glycol, polyethylene glycol, polyethylene glycol-co-propylene glycol, 1,4-cyclohexanedimethanol, hydroquinone-bis-(2-hydroxyethyl)ether, neopentyl glycol, trimethylolpropane, pentaerythritol, other modifying glycols having 5 to 16 carbons, or ethylene glycol, trimethylene glycol, 1,4-butane diol or 2,2,4,4-tetramethyl-1,3-cyclobutanediol.

8. The method for modifying a polyester polymer as specified in claim 1 wherein the second compound is a dicarboxylic acid or polycarboxylic acid.

9. The method for modifying a polyester polymer as specified in claim 8 wherein the second compound is a dicarboxylic acid or polycarboxylic acid which is selected from the group consisting of isophthalic acid, phthalic acid, trimesic acid, pyromellitic acid, cyclohexane-1,4-dicarboxylic acid, cyclohexanediacetic acid, diphenyl-4,4'-dicarboxylic acid, naphthalene-2,6-dicarboxylic acid, the various aliphatic dicarboxylic acids such as oxalic, malonic, succinic, glutaric, adipic, pimelic, suberic, azelaic, sebacic acids and the like, and unsaturated multifunctional acids such as fumaric, citraconic, itaconic and mesaconic acids.

10. The method for modifying a polyester polymer as specified in claim 9 wherein the second compound is an unsaturated multifunctional acid selected from the group consisting of fumaric acid, citraconic acid, itaconic acid, and mesaconic acid.

11. The method for modifying a polyester polymer as specified in claim 8 wherein the second compound is isophthalic acid.

12. The method for modifying a polyester polymer as specified in claim 1 wherein the second compound is added to the polyester polymer with the first compound being subsequently added to the polyester polymer.

13. The method for modifying a polyester polymer as specified in claim 1 wherein the modified polyester polymer is solid state polymerized to increase the molecular weight of the modified polyester polymer.

14. The method for modifying a polyester polymer as specified in claim 6 wherein the first compound is a member selected from the group consisting of salts of sulfonated polyols, salts of sulfonated glycols, salts of phosphonated polyols, and salts of phosphonated glycols.

15. The method for modifying a polyester polymer as specified in claim 1 wherein the first compound is a glycol ester of a salt of 5-sulfoisophthalic acid.

16. The method for modifying a polyester polymer as specified in claim 1 wherein the first compound is a glycol ester of a member selected from the group consisting of lithium salts of 5-sulfoisophthalic acid, sodium salts of 5-sulfoisophthalic acid, magnesium salts of 5-sulfoisophthalic acid, calcium salts of 5-sulfoisophthalic acid, zinc salts of 5-sulfoisophthalic acid, silver salts of 5-sulfoisophthalic acid, tetrabutylphosphonium salts of 5-sulfoisophthalic acid.

17. The method for modifying a polyester polymer as specified in claim 8 wherein the second compound is a member selected from the group consisting of salts of sulfonated dicarboxylic acids, salts of sulfonated polycarboxylic acids, salts of phosphonated dicarboxylic acids, and salts of phosphonated polycarboxylic acids.

18. The method for modifying a polyester polymer as specified in claim 1 wherein the second compound is a salt of 5-sulfoisophthalic acid.

19. The method for modifying a polyester polymer as specified in claim 18 wherein the salt of 5-sulfoisophthalic acid is selected from the group consisting of a lithium salt, a sodium salt, a magnesium salt, a calcium salt, a zinc salt, a silver salt, and a tetrabutylphosphonium salt.

20. The method for modifying a polyester polymer as specified in claim 1 wherein the modification is carried out in the absence of polymerization by conducting said modification under at least atmospheric pressure.

21. The method for modifying a polyester polymer as specified in claim 1 wherein the polyester polymer is a virgin polyester.

* * * * *